(12) United States Patent
Yoon et al.

(10) Patent No.: US 8,480,966 B2
(45) Date of Patent: Jul. 9, 2013

(54) APPARATUS FOR PRODUCING REGENERATIVE WATER FOR A WATER SOFTENER

(75) Inventors: Sung Hun Yoon, Seoul (KR); Won Tae Kim, Gunpo-si (KR)

(73) Assignee: Woongjin Coway Co., Ltd., Gongju-Si (KR)

( * ) Notice: Subject to any disclaimer, the term of this patent is extended or adjusted under 35 U.S.C. 154(b) by 351 days.

(21) Appl. No.: 12/784,395

(22) Filed: May 20, 2010

(65) Prior Publication Data

US 2010/0300976 A1     Dec. 2, 2010

(30) Foreign Application Priority Data

May 28, 2009 (KR) ......................... 10-2009-0046955
Aug. 4, 2009 (KR) ......................... 10-2009-0071737

(51) Int. Cl.
*B01D 35/00* (2006.01)
(52) U.S. Cl.
USPC ............ 422/263; 422/278; 422/282; 210/190
(58) Field of Classification Search
USPC ................... 210/190, 191; 422/263, 278, 282
See application file for complete search history.

(56) References Cited

U.S. PATENT DOCUMENTS

| | | | | |
|---|---|---|---|---|
| 2,086,607 | A | * | 7/1937 | Culligan ........................ 210/191 |
| 2,744,868 | A | * | 5/1956 | Harting .......................... 210/269 |
| 3,307,914 | A | * | 3/1967 | Heiss et al. .................... 422/106 |

FOREIGN PATENT DOCUMENTS

| | | |
|---|---|---|
| JP | 2007-289959 A | 11/2007 |
| KR | 10-2005-0101263 A | 10/2005 |
| KR | 10-0817291 B1 | 3/2008 |
| KR | 10-2008-0103128 A2 | 11/2008 |

* cited by examiner

*Primary Examiner* — Matthew O Savage
(74) *Attorney, Agent, or Firm* — Seed IP Law Group PLLC (57) ABSTRACT

Disclosed herein is an apparatus and method of producing regenerative water. The apparatus includes a main body, a basket, a regenerative substance block and an on/off valve. The main body has a water inlet port through which raw water is supplied into the main body, a water outlet port through which regenerative water is discharged out of the main body, and a drain port which drains an excess of raw water or regenerative water. The basket is provided in the main body. The regenerative substance block is contained in the basket and dissolved by the raw water. The on/off valve is provided on the water outlet port. The raw water dissolves the regenerative substance block for a predetermined duration. When the on/off valve is opened, the produced regenerative water is supplied through the water outlet port into a soft water tank.

8 Claims, 5 Drawing Sheets

APPARATUS FOR PRODUCING REGENERATIVE WATER FOR A WATER SOFTENER

CROSS-REFERENCE TO RELATED APPLICATIONS

This application claims the benefit under 35 U.S.C. §119 (e) of Korean Application No. 10-2009-0046955, filed May 29, 2009 and Korean Application No. 10-2009-0071737, filed Aug. 4, 2009, which applications are incorporated herein by reference in their entireties.

BACKGROUND OF THE INVENTION

1. Field of the Invention

The present invention relates generally to apparatuses for producing regenerative water and, more particularly, to an apparatus for producing regenerative water which periodically regenerates ion exchange resins which are contained in a water softening tank of a water softener and are deteriorated in water softening ability by the use of the water softener over a long period of time. The regenerative water producing apparatus produces regenerative water having appropriate salinity in such a way that a constant amount of raw water is always supplied to a regenerative substance block provided in the apparatus.

Furthermore, the present invention relates generally to methods of producing regenerative water and more particularly, to a method of producing regenerative water which comprises an operation of producing regenerative water by reacting raw water with a regenerative substance block in the apparatus for a preset regenerative water producing duration.

2. Description of the Related Art

Generally, water softeners which are installed in houses or office buildings chemically remove hard-water ions contained in tap water and thus convert hard water into soft water. Typically, tap water contains a large amount of chlorine for purification purposes. In addition, due to factors, such as deteriorated pipes or water pollution, tap water may contain various kinds of heavy metals, such as iron, zinc, lead, mercury, etc., which have negative influences on the human body. Although such tap water containing a small amount of heavy metals is not fatal to the human body, when tap water directly contacts the skin of users washing their skin, metal ions contained in water are bonded to the fatty acids of soap, thus forming metallic impurities. Such metallic impurities contact the skin of users and thus induce skin disorders, such as allergy disorders, or promote skin aging.

To prevent these problems, various water softeners, which change tap water which is hard water into soft water in such a way that tap water passes through strongly acid cation exchange resins containing $Na^+$ so that hard water ingredients, such as $Ca^{2+}$ and $Mg^{2+}$, are substituted for by the $Na^+$ of the cation exchange resins, have been developed and mainly used for washing.

Such water softeners are operated using the principle by which hard water is changed into soft water by substituting calcium ions and magnesium ions, contained in the hard water, for sodium ions. For this, a soft water tank, which has ion exchange resins made of high molecular weight compounds containing sodium ions, is an indispensable element of such a water softener. Furthermore, such a water softener includes a regeneration tank which contains ion exchange resin regenerating material, such as salt, which forms sodium ions when it is dissolved in water. In detail, a large amount of ion exchange resins having fine grain (ball) shapes are stored in the soft water tank of the water softener. In this state, soft water is formed by continuously passing tap water through the soft water tank and by bringing tap water into contact with the ion exchange resins. As this process is repeated, a large amount of $Na^+$ ingredients are removed from the ion exchange resins by continuous contact between tap water and the ion exchange resins. Therefore, to regenerate the ion exchange resins, salt water containing NaCl ingredients is supplied into the soft water tank.

A hydraulic automatic regeneration water softener which can automatically conduct the water regenerating operation was proposed. In the hydraulic automatic regeneration water softener, the regeneration rate changes depending on the water pressure of the regenerating operation. Thus, the duration of the regenerating operation must be controlled by a control program. However, because the flow rate of raw water supplied into the regeneration tank varies depending on water pressure, it is very difficult to maintain the concentration of the regenerative solution constant.

To provide satisfactory regeneration ability using a regenerative solution having inconstant concentration, the time taken to conduct the regenerating operation must be increased. However, in such cases where the time required for the regenerating operation is increased, the amount of regenerative substance used is increased; this is uneconomical.

Meanwhile, another conventional technique which produces regenerative water in such a way as to continuously move regenerative water was proposed. However, in the case where regenerative water only continuously moves, a regenerative substance is always in a state of being in contact with raw water, thus increasing consumption of the regenerative substance. In addition, the regenerative substance cannot sufficiently react with raw water, so that the concentration of regenerative water may become lower than the desired degree.

Another conventional technique in which supplied raw water temporarily stays around a regenerative substance has been proposed. However, in this case where raw water temporarily stays around the regenerative substance, only a portion of the regenerative substance may be dissolved at the location where the raw water resides temporarily; however, the other portion of the regenerative substance may not uniformly dissolve in portions where the water does not temporarily reside, resulting in the regenerative substance being wasted. Furthermore, a structure which can prevent raw water from being supplied in excess is indispensably required. Moreover, the apparatus of this technique must be configured such that even when an excessive amount of raw water is supplied, the regenerative water produced by the reaction between raw water and the regenerative substance remains behind, but the excess portion of the raw water can be exhausted out of the apparatus before it reacts with the regenerative substance. For this, a method of detecting that there is an excess of raw water is required.

Meanwhile, when supplying raw water into the regeneration tank, if the amount of raw water coming into contact with the regenerative substance cannot be controlled within a permissible range, the regenerative substance may be excessively consumed or the concentration of regenerative water may be different from a desired level.

Furthermore, when the amount of regenerative water produced by contact between raw water and the regenerative substance is excessive, if an excess of the regenerative water is not appropriately discharged and the regenerative water overflows the regeneration tank, the function and lifetime of the water softener may markedly deteriorate. In addition, the user may suffer involvement in an accident involving electric shock.

Therefore, a mechanical structure, rather than an electric structure, in which raw water can come into an even amount of contact with the regenerative substance, the concentration of produced regenerative water can be maintained constant, and an excess of the supplied raw water and an excess of the produced regenerative water can be appropriately discharged to the outside, is required.

SUMMARY OF THE INVENTION

Accordingly, the present invention has been made keeping in mind the above problems occurring in the prior art, and an object of the present invention is to provide an apparatus for producing regenerative water in which only when regeneration in a soft water tank is required, raw water is supplied into a main body containing a regenerative substance block to produce regenerative solution having a predetermined concentration and then the produced regenerative solution is supplied into the regenerative tank, so that despite variation in pressure of raw water when supplied into the main body, regenerative water having a constant concentration can be produced and supplied into the soft water tank, thus preventing the regenerative substance from being wasted, thereby reducing the financial burden.

In order to accomplish the above object, in an aspect, the present invention provides an apparatus for producing regenerative water, including: a main body having a hollow container shape, the main body having a water inlet port through which raw water is supplied into the main body, a water outlet port formed at a position adjacent to the water inlet port so that regenerative water is discharged out of the main body through the water outlet port, and a drain port discharging an excess of raw water or regenerative water; a basket provided in the main body such that a lower end of the basket is spaced apart from a bottom of the main body by a predetermined distance, the basket allowing the raw water to pass through the bottom or sidewall thereof; a regenerative substance block contained in the basket, the regenerative substance block being dissolved by the raw water, supplied into the main body, by a predetermined amount; and an on/off valve provided on the water outlet port. The raw water dissolves the regenerative substance block in the main body for a predetermined duration to produce regenerative water, and when the on/off valve is opened, the regenerative water produced in the main body is supplied through the water outlet port into a soft water tank containing ion exchange resins.

The apparatus may further include a flow guide provided in the main body to guide the raw water supplied from the water inlet port towards an interior of the main body or the drain port, thus controlling the amount of regenerative water stored in the main body.

The dissolving the regenerative substance block using the raw water during the predetermined duration may comprise supplying the raw water into the main body through the water inlet port for a raw water supply duration, and dissolving the regenerative substance block 170 using the supplied raw water for a regenerative water producing duration.

The flow guide may include a flow guide body disposed right above the water inlet port, the flow guide body having a planar shape, and a guide tip extending downwards from an edge of the flow guide body.

The water inlet port, the water outlet port and the drain port may be provided through the bottom of the main body.

Furthermore, a salinity of the regenerative water may range from 8% to 15%.

The bottom or sidewall of the basket may comprise a mesh net.

In addition, an upper end of the water inlet port may be disposed at a position higher than an upper end of the drain port with respect to the bottom of the main body.

In another aspect, the present invention provides a method of producing regenerative water, including: (A) supplying raw water into a main body of an apparatus for producing regenerative water for a preset raw water supply duration; (B) producing regenerative water by reacting the supply raw water with a regenerative substance block provided in the apparatus for a preset regenerative water producing duration; (C) supplying the produced regenerative water into a soft water tank by opening an on/off valve provided on a lower end of a water outlet port of the apparatus; and (D) discharging an excess of the raw water, supplied into the main body, and an excess of the regenerative water, produced in the main body, through a drain port to an outside of the apparatus.

Furthermore, (D) discharging may comprise discharging the excess of the raw water through the drain port to the outside of the apparatus when a flow rate of the raw water supplied into the main body is greater than a preset flow rate.

The apparatus may include a flow guide, and (D) discharging may comprise discharging the excess of the raw water along the flow guide through the drain port to the outside of the apparatus when a pressure at which the raw water is supplied into the main body is higher than a preset pressure, thus maintaining a flow rate of raw water supplied into the main body constant.

In addition, (A) supplying may be begun by a signal of a control unit or a signal input by a user into the control unit.

Moreover, (A) supplying may including: transmitting a regenerative water producing signal from the control unit to a directional control valve when (A) supplying begins; and opening a raw water supply path, connected to the apparatus, by the directional control valve in response to the regenerative water producing signal.

Preferably, (B) producing and (A) supplying may be conducted at a same time.

Furthermore, (D) discharging may comprise discharging the excess of the regenerative water through the drain port to the outside of the apparatus when an amount of the produced regenerative water is greater than a preset amount.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, an apparatus and method for producing regenerative water according to a preferred embodiment of the present invention will be described in detail with reference to the attached drawings.

Figure 1:
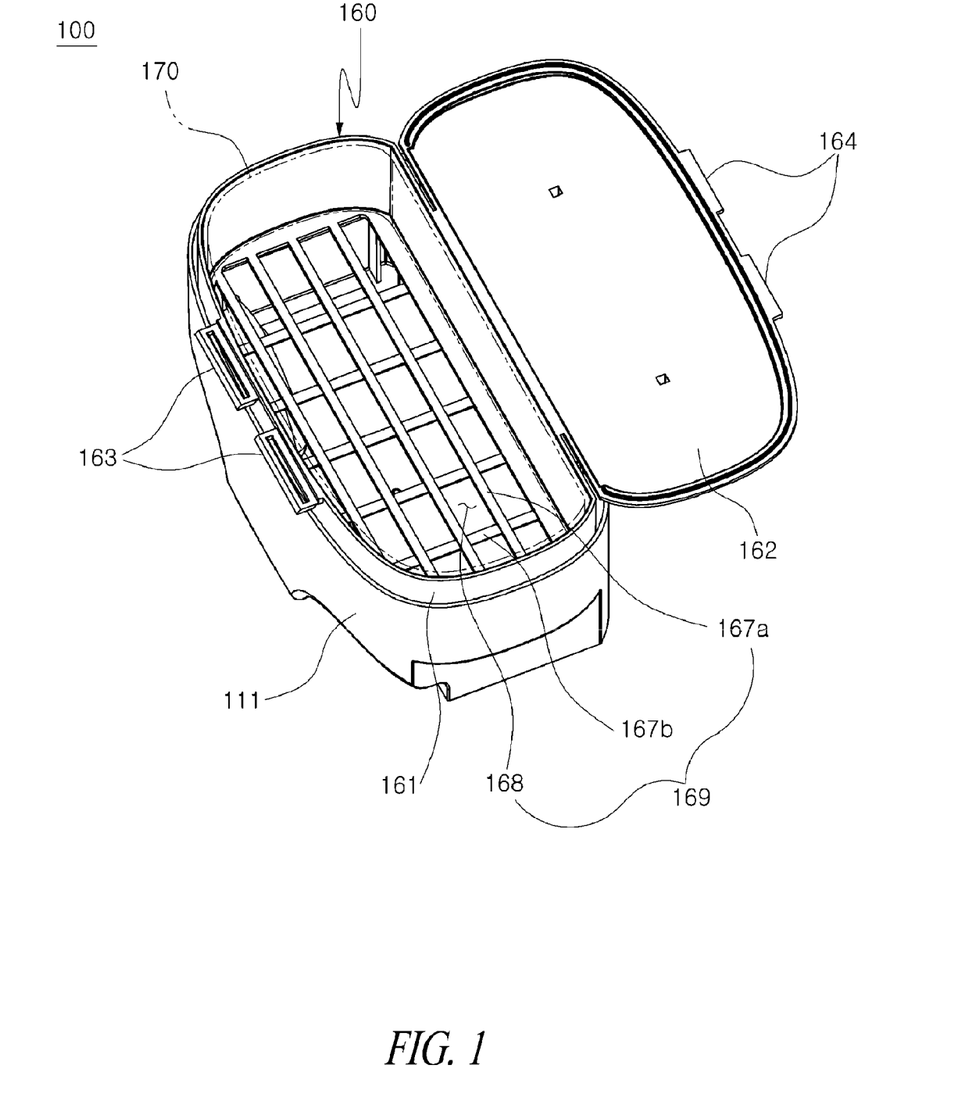
FIG. 1 is a top perspective view of an apparatus for producing regenerative water, according to an embodiment of the present invention.
Figure 2:
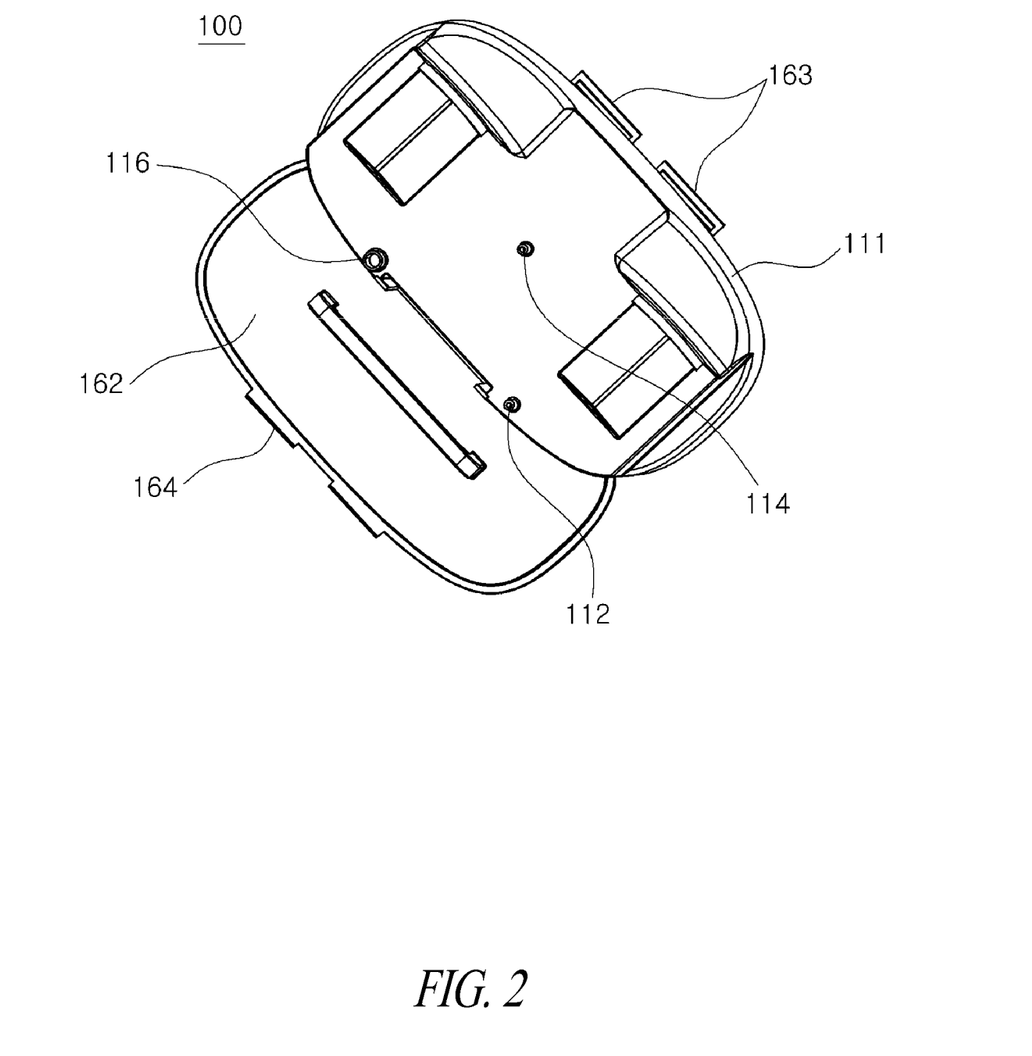
FIG. 2 is a bottom perspective view of the regenerative water producing apparatus of FIG. 1.
Figure 3:
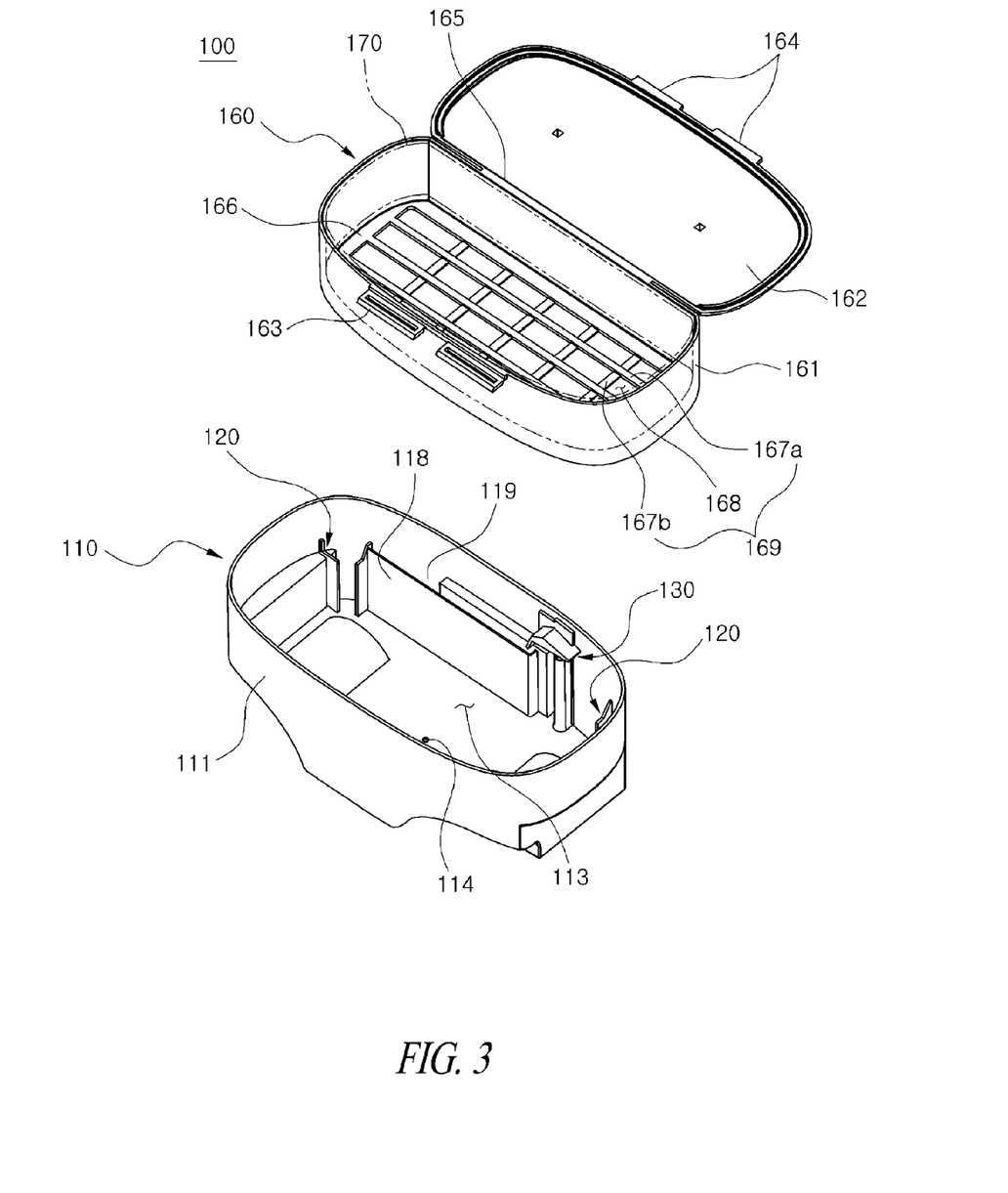
FIG. 3 is an exploded perspective view of the regenerative water producing apparatus of FIG. 1.
Figure 4:
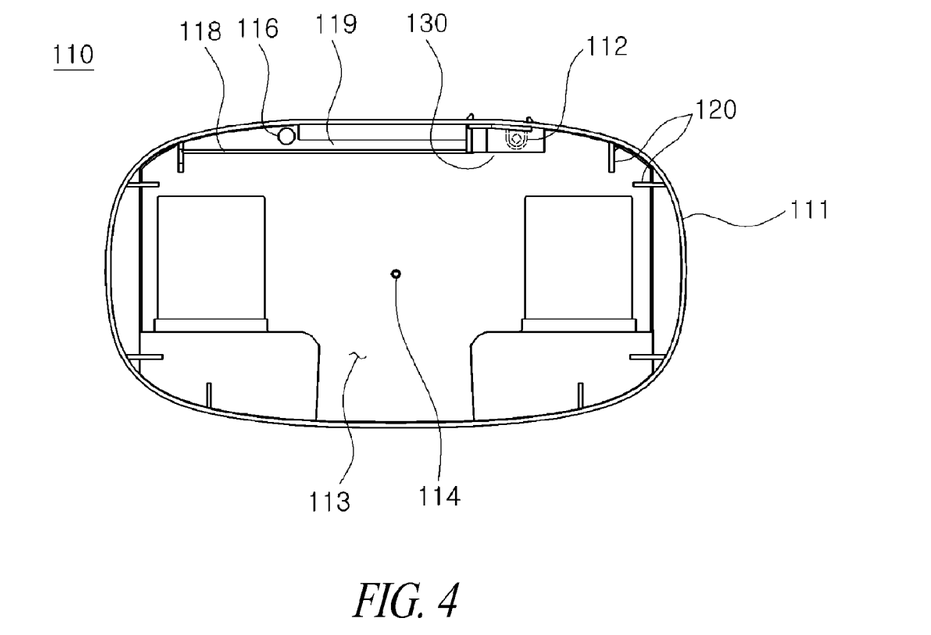
FIG. 4 is a top view showing a main body which is one of the components of the regenerative water producing apparatus of FIG. 3.
Figure 5:
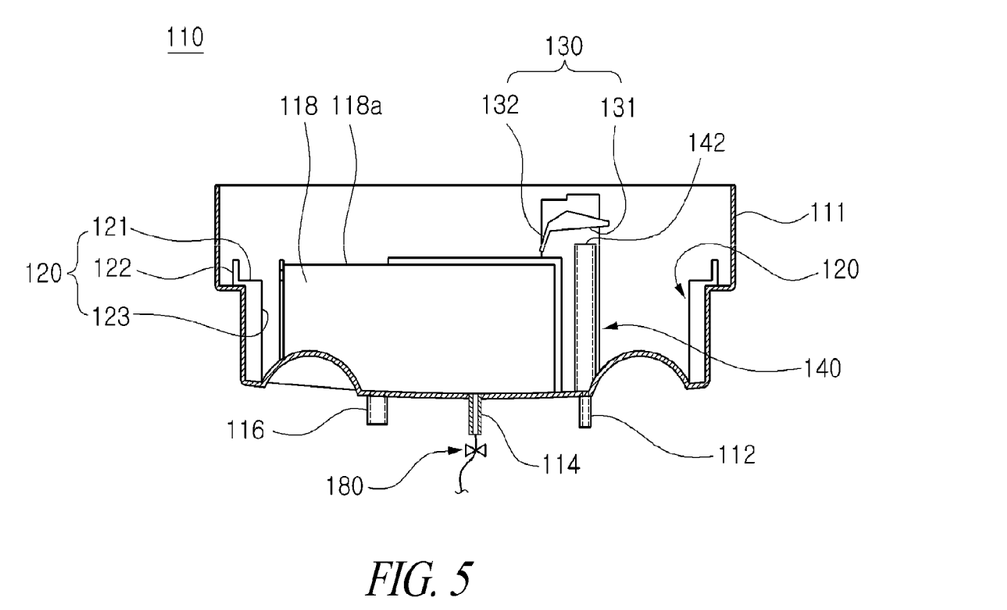
FIG. 5 is a sectional view showing a water inlet port, a water outlet port and a drain port which are provided on the main body of FIG. 3.
Figure 6:
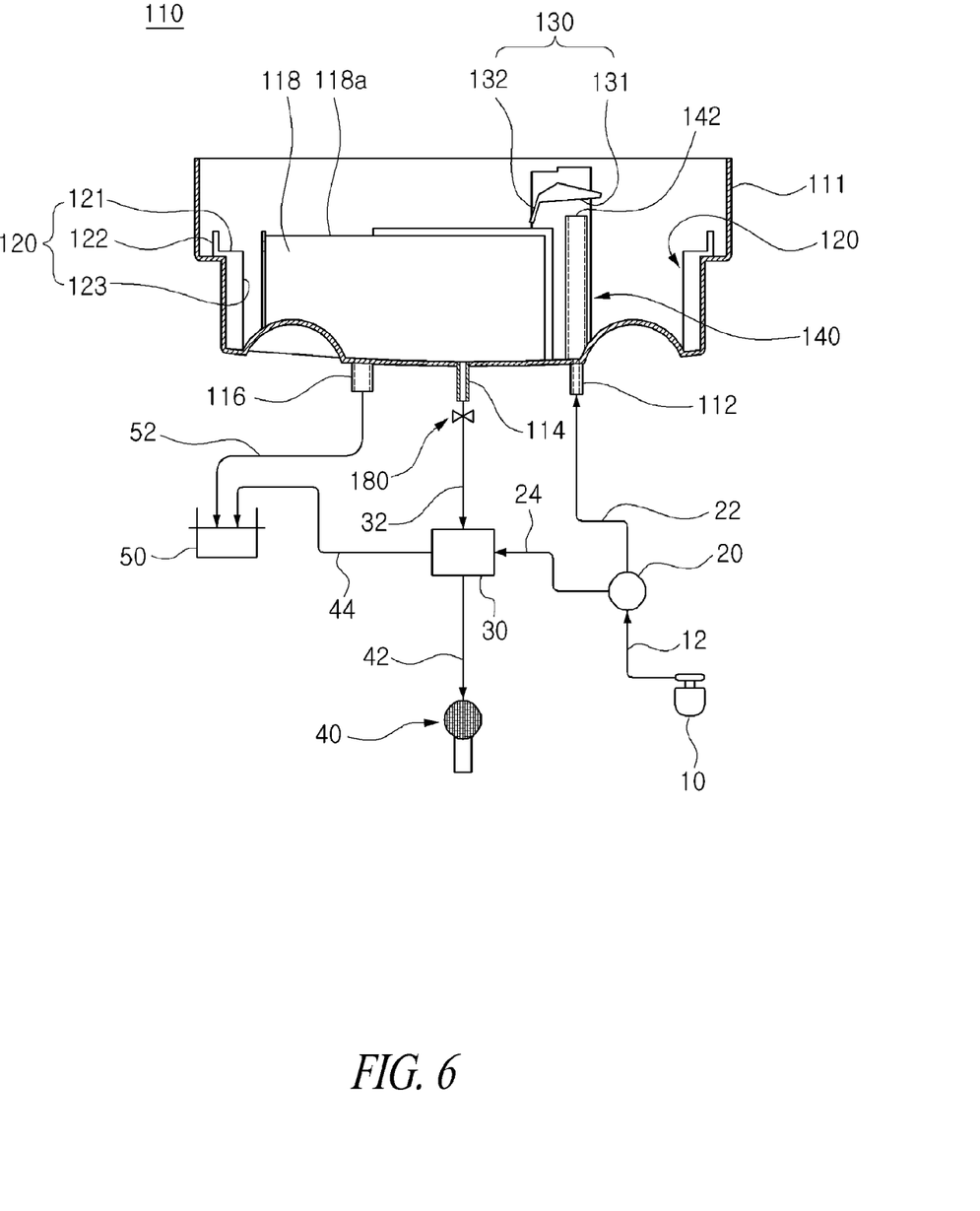
FIG. 6 is a view showing a connection of the main body of FIG. 5 to a water softener.

FIG. 1 is a top perspective view of the apparatus 100 for producing regenerative water, according to the embodiment of the present invention. FIG. 2 is a bottom perspective view of the regenerative water producing apparatus 100 of FIG. 1. FIG. 3 is an exploded perspective view of the regenerative water producing apparatus 100 of FIG. 1. FIG. 4 is a top view showing a main body 110 which is one of the components of the regenerative water producing apparatus 100 of FIG. 3. FIG. 5 is a sectional view showing a water inlet port, a water outlet port and a drain port which are provided on the main body of FIG. 3. FIG. 6 is a view showing the connection of the main body 110 of FIG. 5 to a water softener.

Description of Regenerative Water Producing Apparatus

The general construction of the regenerative water producing apparatus 100 will be described with reference to FIGS. 1 through 5. The regenerative water producing apparatus 100 includes a main body 110 into which raw water is drawn and in which regenerative water is produced, and a basket 160 which is installed in the main body 110 and supports a regenerative substance block 170 therein. The main body 110 and the basket 160 may be integrally formed into a single body. To facilitate cleaning and manufacturing, it is preferable that the main body 110 and the basket 160 be formed so as to be separable with each other. When the basket 160 containing the regenerative substance block 170 is installed in the main body 110, the regenerative substance block 170 maintains a state of being spaced apart from the bottom of the main body 110 by a predetermined distance, thus completing preparation for producing regenerative water.

The main body 110 includes a housing 111, a water inlet port 112, a water outlet port 114 and a drain port 116. The housing 111 has a hollow container shape. The water inlet port 112 is provided at a predetermined position under the bottom of the housing 111 so that raw water is supplied into the housing 111 through the water inlet port 112. The water outlet port 114 is provided under the bottom of the housing 111 at a position adjacent to the water inlet port 112 so that regenerative water is discharged out of the housing 111 through the water outlet port 114. When an excessive amount of raw water is drawn into the housing 111 or an excessive amount of regenerative water is produced, the remnant is discharged out of the housing 111 through the drain port 116. Here, because the regenerative water producing apparatus 100 of the present invention is configured such that water flows downwards due to gravity during the water regeneration process, the water inlet port 112, the water outlet port 114 and the drain port 116 are provided under the housing 111, so that water can be automatically discharged downwards out of the housing 111 by gravity.

The space in the main body 110 is partitioned into a regeneration space 113 and an exhaust space 119 by a partition wall 118 provided in the housing 111. The regeneration space 113 functions to temporarily store therein raw water which is drawn into the housing 111 through the water inlet port 112. The exhaust space 119 functions to prevent an excessive amount of raw water from being in the regeneration space 113. In the state in which the basket 160 containing the regenerative substance block 170 is installed in the main body 110, when raw water is supplied into the main body 110, the regenerative substance block 170 is dissolved by the raw water. The water containing dissolved regenerative material serves as a regenerative agent and is discharged out of the main body 110 through the water outlet port 114 which communicates with the regeneration space 113.

The basket 160 includes a hollow basket body 161 which is open on upper and lower ends thereof, a regenerative substance support 166 which is provided in the open lower end of the basket body 161, and a cover 162 which is rotatably coupled to the edge of the open upper end of the basket body 161. The regenerative substance support 166 functions to support the regenerative substance block 170 thereon and preferably has a planar surface such that the regenerative substance block 170 is evenly dissolved by water.

The regenerative substance support 166 has a mesh net structure 169 to allow raw water to be drawn into the basket 160 and come into contact with the regenerative substance block 170. The mesh net structure 169 includes longitudinal bars 167a and lateral bars 167b which are configured such that a plurality of through-holes 168 is formed by crossing the longitudinal bars 167a and the lateral bars 167b. Although the mesh net structure 169 has been illustrated as being formed only in the regenerative substance support 166, the present invention is not limited thereto. For example, as necessary, an additional net structure may be formed in the circumferential outer surface of the lower end of the basket body 161. In this case, raw water can be supplied into the basket body 161 through the bottom and sidewall of the regenerative substance support 166 to dissolve the regenerative substance block 170.

The cover 162 is rotatably coupled to the edge of the upper end of the basket body 161 by a hinge 165 to openably close the open upper end of the basket 160. A fastening protrusion 164 is provided on the edge of the cover 162 at a predetermined position opposite to the hinge 165. A fastening catch 163 is provided on the basket body 161 at a position corresponding to the fastening protrusion 164. Thus, the fastening protrusion 164 is separately locked to the fastening catch 163.

Meanwhile, when the basket 160 is seated into the main body 110, the basket 160 must always be disposed at a correct position. For this, basket mounts 120 are provided in the housing 111. Each basket mount 120 includes a mount body 123 which extends from the bottom of the housing 111, and a perimeter support protrusion 122 which is provided on an upper end 121 of the mount body 123. The perimeter support protrusions 122 guide the basket 160 when it is seated onto the mount bodies 123 and then support the basket 160 to prevent the basket 160 from undesirably moving on the mount bodies 123.

With regard to the drain port 116, if an excessive amount of raw water is drawn into the housing 111 or an excessive amount of regenerative water is produced in the housing 111, the remnant is discharged out of the housing 111 through the drain port 116 and then sent into a drain 50 through a drain pipe 52. The flow of the excess raw water supplied into the housing 111 which is at a flow rate higher than a preset flow rate will be explained later herein. When the amount of produced regenerative water is greater than a preset amount, an excess of the produced regenerative water can be discharged out of the housing 111 through the drain port 116. The preset amount of produced regenerative water can be easily controlled by the manufacturer in such a way as to adjust, e.g., the shape of the housing 111.

Flow Guide 130

In the present invention, a flow guide 130 is provided in the main body 110. The flow guide 130 guides raw water from the water inlet port 112 into the main body 110 or the drain port 116 to control the amount of regenerative water stored in the main body 110. The flow guide 130 includes a flow guide body 131 which has a planar shape and is disposed right above the water inlet port 112, and a guide tip 132 which extends downwards from the edge of the flow guide body 131. Furthermore, an inlet water guide 140 is provided between the water inlet port 112 and the flow guide 130, so that raw water is supplied from the water inlet port 112 formed in the bottom of the housing 111 to the flow guide 130 through the inlet water guide 140.

Preferably, an upper end 142 of the inlet water guide 140 is disposed at a position higher than an upper edge 118a of the partition wall 118 with respect to the bottom of the main body 110. When the pressure of raw water supplied into the housing 111 through the water inlet port 112 is relatively low, the supplied raw water is directly transferred into the regeneration space 113 via the upper end of the inlet water guide 140.

When the pressure of raw water supplied into the housing 111 through the water inlet port 112 is higher than a preset pressure, the supplied raw water is scattered in all circumferential directions along the lower surface of the flow guide 130. In detail, when the pressure of raw water supplied into the housing 111 is relatively high, the amount of raw water supplied into the housing 111 during a unit time is increased. Thus, the amount of the regenerative substance block 170 that dissolves during a unit of time is also increased. Hence, the amount or concentration of regenerative solution may not reach the desired value. To prevent this problem, in the present invention, when the pressure of raw water supplied into the housing 111 is excessively increased, some of the supplied raw water is directly guided into the exhaust space 119. Furthermore, as an inflow rate of raw water is increased by an increase of the pressure of raw water supplied into the housing 111, a flow rate of raw water which is directly drawn into the exhaust space 119 is also increased. Therefore, an almost constant amount of raw water can be supplied into the regeneration space 113 and reacts with the regenerative substance block 170.

In more detail, if the pressure at which raw water is supplied from the water supply 10 into the housing 111 is suddenly increased, the flow rate of raw water is increased and the housing 111 is excessively and rapidly charged with raw water. In this case, an amount of raw water greater than that supplied when raw water is supplied into the housing 111 at an initial desired pressure is drawn into the housing 111 for a unit of time. Thus, the amount of dissolved regenerative substance block 170 is increased, so that the salinity of the produced regenerative water becomes different from the initial desired value. To prevent this problem, in the present invention, the flow guide 130 is disposed above the inlet water guide 140. Thus, even if raw water is drawn into the housing 111 at relatively high pressure, only some of the raw water is supplied into the regeneration space 113 of the housing 111 and the remaining raw water is supplied into the exhaust space 119 towards the drain port 116. Therefore, in the present invention, the salinity of regenerative water produced in the main body 110 can be maintained within an allowed range.

A manufacturer determines the amount of raw water reacting with regenerative substance, hereinafter, to be referred to as the 'preset flow rate of raw water'. When making this determination, the salinity of the regenerative solution is previously taken into account. After the preset flow rate of raw water is determined, the shape of the flow guide 130 is determined such that an excess of raw water supplied at a flow rate exceeding the preset flow rate is discharged out of the housing 111 without having reacted with the regenerative substance block 170. In other words, the installation angles of the flow guide body 131 and the guide tip 132 of the flow guide 130 are determined such that an excess of raw water supplied at a pressure higher than the preset pressure can be guided towards the drain port 116

Water Inlet Port 112

Hereinafter, the characteristics of the regenerative water producing apparatus 100 of the present invention will be explained with reference to Table 1 based on the result of tests showing a variation of factors, for example, the time taken to supply raw water into the main body 110, depending on a diameter of the water inlet port 112.

TABLE 1

| Items | Diameter of water inlet port | | |
|---|---|---|---|
| | 1.0 mm | 1.5 mm | 2.0 mm |
| Time taken to supply raw water into main body | 3 minutes | 1.5 minutes | 1 minute |
| Inner diameter of drain port | 6.5 mm | 6.5 mm | 6.5 mm |
| Salinity of discharge water | 1.7% | 0.2% | 0.6% |
| Amount of discharge water | 1,650 ml | 1,500 ml | 1,700 ml |
| Amount of regenerative water discharged through drain port | 28 g | 3 g | 10.2 g |

The results of the tests show variations of data of relative factors depending on the diameter of the water inlet port 112 when the pressure of raw water supplied into the main body 110 is maintained at 0.7 kgf/cm$^2$ which is the minimum supply pressure. From Table 1, it can be interpreted that when the diameter of the water inlet port 112 is 1.5 mm, the amount of regenerative water overflowing into the drain port 116 is minimized and the salinity of discharge water is also lowest.

Process of Producing Regenerative Water

Hereinafter, a process of producing regenerative water using the present invention will be explained with reference to FIGS. 5 and 6.

A control unit (not shown) produces signals to produce regenerative water. The signal may be generated by input of the user or, alternatively, it may be automatically generated under control of a water softening system. For instance, the latter case may be used when the concentration of soft water in a soft water tank 30 is below a reference value or when the amount of soft water which is used by the user exceeds a reference value. In addition, the latter case may be used by other well known methods according to the conventional techniques. For this, a sensor may be provided in the soft water tank 30 or the regenerative water producing apparatus 100.

When the signal to produce regenerative water is applied to a directional control valve 20, the directional control valve 20 moves raw water to the regenerative water producing apparatus 100. Then, raw water which is drawn from the water supply 10 into the water inlet port 112 via the directional control valve 20 and the raw water supply path 22 is supplied into the housing 111 through the inlet water guide 140.

The supplied raw water is brought into contact with the regenerative substance block 170 and is charged into the regeneration space of the housing 111 until the water level reaches the upper edge 118a of the partition wall 118. That is, when the water level of raw water in the housing 111 exceeds the upper edge 118a, an excess of raw water is automatically drawn into the exhaust space 119. Therefore, the volume in which raw water is regenerated in the housing 111 refers to the volume of the regeneration space 113 which is defined between the bottom of the housing 111 and the upper edge 118a of the partition wall 118.

In the regenerative water producing apparatus 100 of the present invention, after raw water has dissolved the regenerative substance block 170 in the main body 110 for a predetermined duration, an on/off valve 180 which is provided on the water outlet port 114 is opened, after which regenerative water produced in the main body 110 is supplied through the water outlet port 114 into the soft water tank 30 which contains ion exchange resins therein. The process of dissolving the regenerative substance block 170 using raw water for the predetermined duration described above comprises a process of supplying raw water into the main body 110 through the water inlet port 112 for a raw water supply duration and a process of dissolving the regenerative substance block 170 using the supplied raw water for a regenerative water producing duration.

In detail, when it is systemically determined that the lifetime of the ion exchange resins has expired by counting the number of times the soft water tank 30 has performed water softening operations and calculating the amount of supplied soft water, raw water is supplied into the main body 110, and the process of dissolving the regenerative substance block is conducted for a predetermined duration, and then the on/off valve 180 is opened to supply the produced regenerative water into the soft water tank 30. For example, raw water is supplied into the water inlet port 112 during the raw water supply duration of one minute, and then the process of producing regenerative water having appropriate salinity is conducted during the regenerative water producing duration of two minutes. The raw water supply duration and the regenerative water producing duration are only examples for the sake of illustration, and the durations may be adjusted in various manners to set the salinity of regenerative water to a desired appropriate value. In the present invention, the salinity of the regenerative solution produced in the regeneration space 113 of the main body 110 is preferably adjusted within a range from 8% to 15% to enhance the regenerative ability of the ion exchange resins. More preferably, a process of adjusting the salinity of regenerative solution within a range from 12% to 15% is conducted to further enhance the regenerative ability and produce regenerative water having an appropriate concentration despite supplying a relatively small amount of raw water.

The regenerative water producing duration can be previously set by the manufacturer. The set value can be stored in the control unit (not shown).

In this embodiment, although the raw water supply duration and the regenerative water producing duration have been illustrated as being respectively one minute and two minutes, these may be changed. Furthermore, the supply of raw water and the production of regenerative water may be conducted at the same time. In other words, when the supply of raw water into the regenerative water producing apparatus begins, the regenerative water producing duration may immediately begin. This can be easily set in the control unit (not shown) by the manufacturer.

The above-stated range of the salinity of regenerative water is a range required to ensure effective regeneration operation in the soft water tank 30. Although the salinity of regenerative water has been illustrated as being varied by adjusting the above-mentioned durations, it is not limited to this. For example, the salinity of regenerative water may be controlled within the above-stated appropriate range by adjusting other factors, such as the volume of the main body 110, etc.

After the preset regenerative water producing duration has passed, the on/off valve 180 is opened. That is, the on/off valve 180 maintains the closed state during the preset regenerative water producing duration such that raw water can sufficiently react with the regenerative substance. Of course, the timing at which the on/off valve 180 is opened or closed can be easily set in the control unit by the manufacturer.

The term "preset raw water supply duration" means a duration for which raw water is supplied into the main body 110. The raw water supply duration can be previously set in response to the volume of the main body 110. The manufacturer can easily set this raw water supply duration. Furthermore, during the same raw water supply duration, the pressure at which raw water is supplied may become different. In the present invention, the flow guide 130 can directly discharge an excess of raw water out of the main body 110. Therefore, after the raw water supply duration is determined in response to the volume of the main body 110, a constant amount of raw water is always supplied into the regeneration space 113 of the main body 110 regardless of the supply pressure of raw water. As a result, a constant concentration of regenerative water can always be produced.

The term "preset regenerative water producing duration" means a duration for which raw water supplied into the main body 110 reacts with the regenerative substance, in other words, the time until the on/off valve 180 is opened. The regenerative water producing duration can be determined by tests such that a desired concentration of regenerative water is realized depending on a reaction rate between the regenerative substance and raw water. Furthermore, the regenerative water producing duration can be easily adjusted depending on the quality of the regenerative substance.

Water Softening System Using Regenerative Water Producing Apparatus 100

Hereinafter, the water softening system using the regenerative water producing apparatus 100 will be explained with reference to FIG. 6.

The directional control valve 20 is connected to the water inlet port 112 by the water supply path 22. The soft water tank 30 is connected to the water outlet port 114 by a regeneration supply path 32. The control unit (not shown) controls the on/off valve 180 such that regenerative water is supplied from the main body 110 into the soft water tank 30. After the regeneration has taken place in the soft water tank 30, water containing impurities is exhausted to the drain 50 through an exhaust path 44.

The water supply 10 supplies raw water into the directional control valve 20 through a raw water supply path 12. Depending on an order of the control unit (not shown), the directional control valve 20 supplies the raw water into the soft water tank 30 through a conversion water path 24 or supplies it to the water inlet port 112. Raw water which is supplied into the soft water tank 30 through the conversion water path 24 softens and then is transferred to a shower tap 40 through a soft water path 42 to provide soft water to the user.

As such, in the regenerative water producing apparatus 100 according to the present invention, before a regenerating process is conducted in the soft water tank 30, raw water for regeneration is supplied into the main body 110 during the preset raw water supply duration, and the process of setting the concentration of the regenerative solution within the appropriate range is conducted during the preset regenerative water producing duration. Therefore, the regenerative solution can be produced when regeneration is required. Furthermore, raw water is prevented from being excessively supplied into the regenerative space 113 of the main body 110, so that the concentration of the regenerative solution can be maintained constant, thus enhancing the quality of the soft water.

As described above, in an apparatus for producing regenerative water according to the present invention, only when regeneration in a soft water tank is required, is raw water supplied into a main body containing a regenerative substance block to produce regenerative solution having a predetermined concentration and is the produced regenerative solution then supplied into the regenerative tank. Hence, despite variations in the pressure of raw water when supplied into the main body, regenerative water having a constant concentration can be produced and supplied into the soft water tank, thus preventing the regenerative substance from being wasted, thereby reducing the economic burden.

Furthermore, a flow guide is installed in the main body to control the flow of raw water depending on the pressure at which the raw water is supplied into the main body. Thus, an excessive amount of raw water is prevented from being supplied into the main body, so that the regenerative substance block can be successively dissolved from the lower end thereof towards the top. Therefore, regenerative water having a constant concentration can be repeatedly produced.

In addition, the regenerative substance block can be evenly consumed, in other words, it can be efficiently used. Moreover, the concentration and the amount of produced regenerative water can be easily controlled.

Also, an excess of raw water supplied into the main body and an excess of the produced regenerative water can be effectively discharged out of the main body, thus reducing consumption of the regenerative substance, and increasing the lifetime of the water softener.

Furthermore, the apparatus is configured such that raw water and regenerative water are drained through a single drain port, thus reducing the size, weight and production cost of the apparatus. In the case where the drained regenerative water is used separately, bypass can be facilitated.

Although the preferred embodiment of the present invention has been disclosed for illustrative purposes, the present invention is not limited to the embodiment. Furthermore, those skilled in the art will appreciate that various modifications, additions and substitutions are possible, without departing from the scope and spirit of the invention as disclosed in the accompanying claims. Therefore, these modifications, additions and substitutions must be regarded as falling within the bounds of the present invention.

What is claimed is:

1. An apparatus for producing regenerative water comprising:
    a main body having a hollow container shape, the main body having a water inlet port through which raw water is supplied into the main body, a water outlet port formed at a position adjacent to the water inlet port for discharging regenerative water out of the main body, and a drain port for discharging an excess of raw water or regenerative water;
    a basket provided in the main body with a lower end of the basket spaced apart from a bottom of the main body by a predetermined distance, the basket allowing the raw water to pass through the bottom or a sidewall thereof;
    a regenerative substance block contained in the basket, the regenerative substance block being dissolved by the raw water supplied into the main body;
    an on/off valve provided on the water outlet port; and
    a flow guide provided in the main body to guide the raw water supplied from the water inlet port towards an interior of the main body or the drain port, thus controlling the amount of regenerative water stored in the main body, the flow guide comprising a flow guide body disposed directly above an upper end of an inlet water guide provided between the water inlet port and the flow guide and further comprising a guide tip extending from the flow guide body and disposed directly above an exhaust space which is defined by a partition wall provided in the main body, a bottom of the exhaust space being connected to the drain port,
    wherein the raw water dissolves the regenerative substance block in the main body to produce regenerative water, and when the on/off valve is opened, the regenerative water produced in the main body flows through the water outlet port.

2. The apparatus as set forth in claim 1, wherein dissolving the regenerative substance block using the raw water comprises supplying the raw water into the main body through the water inlet port for a raw water supply duration, and contacting the regenerative substance block with the supplied raw water for a regenerative water producing duration.

3. The apparatus as set forth in claim 1, wherein the water inlet port, the water outlet port and the drain port are provided through the bottom of the main body.

4. The apparatus as set forth in claim 1, wherein the regenerative water generated at a regeneration space of the main body has a salinity ranging from 8% to 15%.

5. The apparatus as set forth in claim 1, wherein a bottom or sidewall of the basket comprises a mesh structure.

6. The apparatus as set forth in claim 1, wherein an upper end of the flow guide is disposed at a position higher than an upper end of the partition wall with respect to the bottom of the main body.

7. An apparatus for producing regenerative water comprising:
    a main body having a hollow container shape, the main body having a water inlet port through which raw water is supplied into the main body, a water outlet port formed at a position adjacent to the water inlet port for discharging regenerative water out of the main body, and a drain port for discharging an excess of raw water or regenerative water;
    a basket provided in the main body with a lower end of the basket spaced apart from a bottom of the main body by a predetermined distance, the basket allowing the raw water to pass through the bottom or a sidewall thereof;
    a regenerative substance block contained in the basket, the regenerative substance block being dissolved by the raw water supplied into the main body;
    an on/off valve provided on the water outlet port; and
    a flow guide provided in the main body to guide the raw water supplied from the water inlet port towards an interior of the main body or the drain port, thus controlling the amount of regenerative water stored in the main body, the flow guide including a flow guide body disposed directly above an upper end of an inlet water guide provided between the water inlet port and the flow guide, the flow guide body having a planar shape, and the flow guide body including a guide tip extending downward from an edge of the flow guide body and disposed directly above an exhaust space defined by a partition wall provided in the main body, a bottom of the exhaust space being connected to the drain port,
    wherein the raw water dissolves the regenerative substance block in the main body to produce regenerative water, and when the on/off valve is opened, the regenerative water produced in the main body flows through the water outlet port.

8. An apparatus for producing regenerative water comprising:
- a main body having a hollow container shape, the main body having a water inlet port through which raw water is supplied into the main body, a water outlet port formed at a position adjacent to the water inlet port for discharging regenerative water out of the main body, and a drain port for discharging an excess of raw water or regenerative water;
- a basket provided in the main body with a lower end of the basket spaced apart from a bottom of the main body by a predetermined distance, the basket allowing the raw water to pass through the bottom or a sidewall thereof;
- a regenerative substance block contained in the basket, the regenerative substance block being dissolved by the raw water supplied into the main body;
- an on/off valve provided on the water outlet port; and
- a flow guide provided in the main body to guide the raw water supplied from the water inlet port towards an interior of the main body or the drain port, thus controlling the amount of regenerative water stored in the main body, the flow guide including a flow guide body disposed directly above an upper end of an inlet water guide provided between the water inlet port and the flow guide, the flow guide body having a planar shape, and the flow guide body including a guide tip extending downward from an edge of the flow guide body and disposed directly above an exhaust space defined by a partition wall coupled to a bottom wall and a sidewall of the main body, a bottom of the exhaust space being connected to the drain port, wherein the raw water dissolves the regenerative substance block in the main body to produce regenerative water, and when the on/off valve is opened, the regenerative water produced in the main body flows through the water outlet port.

* * * * *